(12) United States Patent
Yoshioka et al.

(10) Patent No.: US 6,914,634 B2
(45) Date of Patent: Jul. 5, 2005

(54) DIGITAL CAMERA

(75) Inventors: Daigo Yoshioka, Toyonaka (JP); Hisanori Itoh, Osaka (JP); Yoshio Nakagawa, Sakai (JP); Shoichi Minato, Sakai (JP)

(73) Assignee: Minolta Co., Ltd., Osaka (JP)

( * ) Notice: Subject to any disclaimer, the term of this patent is extended or adjusted under 35 U.S.C. 154(b) by 434 days.

(21) Appl. No.: 09/751,155

(22) Filed: Dec. 27, 2000

(65) Prior Publication Data

US 2001/0005232 A1 Jun. 28, 2001

(30) Foreign Application Priority Data

Dec. 28, 1999 (JP) .......................................... 11-373718

(51) Int. Cl.⁷ .............................................. H04N 5/225
(52) U.S. Cl. ..................................... 348/341; 396/354
(58) Field of Search ............................... 396/354–359, 396/276, 373, 385, 386; 348/340, 335, 341, 344

(56) References Cited

U.S. PATENT DOCUMENTS

| | | | |
|---|---|---|---|
| 4,081,807 A | | 3/1978 | Urano et al. ................. 354/152 |
| 4,562,346 A | | 12/1985 | Hayashi et al. ............. 250/201 |
| 4,626,918 A | * | 12/1986 | Morisawa ................... 348/341 |
| 4,822,141 A | * | 4/1989 | McAdams ................... 349/23 |
| 4,941,010 A | * | 7/1990 | Aihara et al. ............... 396/111 |
| 4,972,216 A | | 11/1990 | Ueda et al. ................. 354/225 |
| 5,029,989 A | * | 7/1991 | Phillips ...................... 359/276 |
| 5,150,215 A | * | 9/1992 | Shi ............................. 348/64 |
| 5,359,364 A | | 10/1994 | Kayanuma et al. ......... 348/343 |
| 5,854,657 A | * | 12/1998 | Um ............................ 348/340 |
| 5,860,034 A | * | 1/1999 | Hori et al. .................. 396/373 |
| 6,227,726 B1 | * | 5/2001 | Higuchi ...................... 396/358 |
| 6,249,650 B1 | * | 6/2001 | Iwamoto ..................... 396/271 |
| 6,266,083 B1 | * | 7/2001 | Sakaegi et al. ......... 348/207.99 |
| 6,549,237 B1 | * | 4/2003 | Inuma et al. ........... 348/333.06 |
| 6,630,959 B1 | * | 10/2003 | Shono ........................ 348/344 |

* cited by examiner

*Primary Examiner*—Tuan Ho
*Assistant Examiner*—Timothy J. Henn
(74) *Attorney, Agent, or Firm*—Sidley Austin Brown & Wood LLP

(57) ABSTRACT

A digital camera having a taking lens, a finder for viewing light transmitted through the taking lens, an image sensing element for optoelectrically converting light which passes through the taking lens, a light splitter capable of changing transmittance and dividing the light transmitted through the taking lens to the image sensing element and the finder, a light splitter driver for driving the light splitter to a position to split the light between the image sensing element and the viewfinder when viewing and driving the light splitter to retract a position for directing the light only to the image sensing element during photography, and a controller for controlling the light splitter to a semi-transparent state to direct light to the image sensing element and the viewfinder when viewing and controlling the light splitter to a blocking state during photography.

10 Claims, 7 Drawing Sheets

DIGITAL CAMERA

This application is based on Patent Application No. HEI 11-373718 filed in Japan, the content of which is hereby incorporated by reference.

BACKGROUND OF THE INVENTION

1. Field of the Invention

The present invention relates to a camera of the single lens reflex type using a semi-transparent mirror as a pop-up mirror, and specifically relates to a digital camera of the single lens reflex type provided with a pop-up semi-transparent mirror having a function of blocking stray light entering the camera through the finder during photography.

2. Description of the Related Art

Although there are various types of cameras, in digital cameras of the lens shutter type, an image to be photographed is not viewed through the photographic optical system but rather is viewed through a finder optical system provided separately. In this type of digital camera, when the magnification ratio is increased and near range imaging is performed, a problem arises insofar as the range of the image viewed during image sensing and the image actually sensed is shifted due to parallax. In order to eliminate this disadvantage the single lens reflex type digital camera has been proposed.

Although there are various types of single lens reflex cameras, such cameras typically use a totally reflective mirror as a pop-up mirror. In this type of single lens reflex digital camera, the totally reflective mirror is disposed at a position (finder viewing position) inclined 45° relative to the optical path while the photographer is looking through the finder. Since the light passing through the taking lens cannot reach the image sensing element when the totally reflective mirror is set at the finder viewing position, disadvantages arise insofar as autofocusing by the image sensing element, exposure confirmation, and white balance adjustment cannot be performed.

Digital cameras of the single lens reflex type using a semi-transparent mirror substituted for the aforesaid totally transparent mirror have been proposed. In this type of single lens reflex digital camera, light passing through the taking lens is normally split to the image sensing element and the finder, but in this case further disadvantages arise insofar as only one half the amount of light reaches the image sensing element, thus darkening the image, and limiting the photographic conditions.

A digital camera of the single lens reflex type using a semi-transparent mirror as a pop-up mirror is proposed to eliminate these disadvantages. A camera of this type is shown in FIG. 1. In FIG. 1, light passing through a taking lens 1 is split in two so as to form light used for image formation on a solid state image sensing element 3, and light used for image viewing passing through an eyepiece finder 9. The photographer is able to view the image to be sensed through the finder, and make various adjustments and settings based on the image data collected by the solid state image sensing element 3. Thereafter, when actually taking the photograph, a semi-transparent mirror 2 springs upward in the arrow a direction to direct the entirety of the light from the taking lens 1 to the solid state image sensing element 3 for use in image sensing, as shown in FIG. 2. As a result, the amount of light used is approximately double that when a prism is used, making it difficult to restrict the photographic conditions, and allowing photography under a broader range of photographic conditions.

Digital cameras of the single lens reflex type using a semi-transparent mirror as a pop-up mirror have the further disadvantages listed below.

As shown in FIG. 2, during daytime photography, the light from the sun S enters the interior of the camera as harmful external light, i.e., stray light, from the finder eyepiece 9, as indicated by the arrow b. During photography, since the semi-transparent mirror 2 is set at the up position, after the stray light is transmitted through the semi-transparent mirror 2, this light is reflected by the interior wall surface of the camera body 20 and attains the solid state image sensing element 3 Accordingly, this stray light adversely affects the photographed image as ghost and flare, and is the cause of exposure error. Particularly during photography using the self timer, or during photography while viewing a liquid crystal display 19 provided on the back of the camera body, the stray light phenomenon becomes marked because the face of the photographer is separated from the finder eyepiece 9 such that the face of the photographer no longer covers the eyepiece 9.

When the semi-transparent mirror 2 is lifted during photography, the light passing through the taking lens 1 is directed only to the image sensing element 3, and is not directed to the finder, such that as a natural result the photographer cannot see the image through the finder when the photograph is taken. That is, the photographer cannot directly confirm through the finder whether or not there was an error in the image when the photograph is taken.

SUMMARY OF THE INVENTION

A main aspect of the art to be solved by the present invention is to prevent stray light from the finder from reverse entry when the pop-up semi-transparent mirror is lifted during photography, in a digital camera of the single lens reflex type provided with a pop-up semi-transparent mirror.

Another aspect of the art of the present invention is to allow an image to be viewed through the finder even when the pop-up semi-transparent mirror is lifted during photography.

These aspects of the art are resolved by the present invention which provides a digital camera having the following construction.

The digital camera of the present invention comprises a taking lens, a finder for viewing light transmitted through the taking lens, an image sensing element for optoelectrically converting light which passes through the taking lens, a light splitting means capable of changing transmittance and dividing the light transmitted through the taking lens to the image sensing element and the finder, a light splitting means driving means for driving the light splitting means to a position to split the light between the image sensing element and the viewfinder when viewing and driving the light splitting means to retract a position for directing the light only to the image sensing element during photography, and a control means for controlling the light splitting means to a semi-transparent state to direct light to the image sensing element and the viewfinder when viewing and controlling the light splitting means to a blocking state during photography.

According to this construction, since the light splitting means blocks the light when the light splitting means is moved to the retracted position during photography, external light entering from the finder eyepiece is prevented from advancing further into the interior of the camera by the light splitting means. As a result, the external light cannot advance to the image sensing element, thereby preventing the generation of ghosts and flare.

The light splitting means comprises a liquid crystal plate of variable transmittance.

The light splitting means provides the liquid crystal plate having variable transmittance on a semi-transparent mirror.

It is desirable that the light splitting means displays an image received from the image sensing element when in the retracted state.

It is desirable to have a continuous image sensing means for continuously sensing a plurality of images, such that the light splitting means drive means maintains the light splitting means at the retracted position until continuous image sensing is completed.

It is desirable that the light splitting means drive means maintains the light splitting means at the retracted position for a specific time when the light splitting means is retracted to display a sensed image.

It is desirable to have a light splitting means return indicator, such that the light splitting means drive means returns the light splitting means based on specification from the light splitting means return indicator when the light splitting means is retracted.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

The embodiments of the digital camera of the present invention are described in detail hereinafter with reference to the accompanying drawings.

Figure 1:
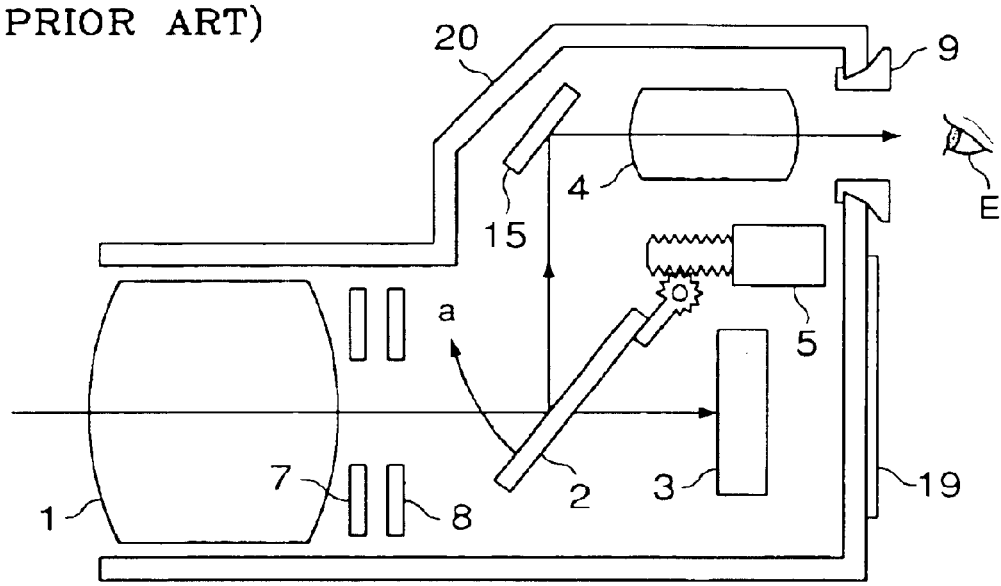
FIG. 1 is a cross section view of the essential part of a conventional digital camera.
Figure 2:
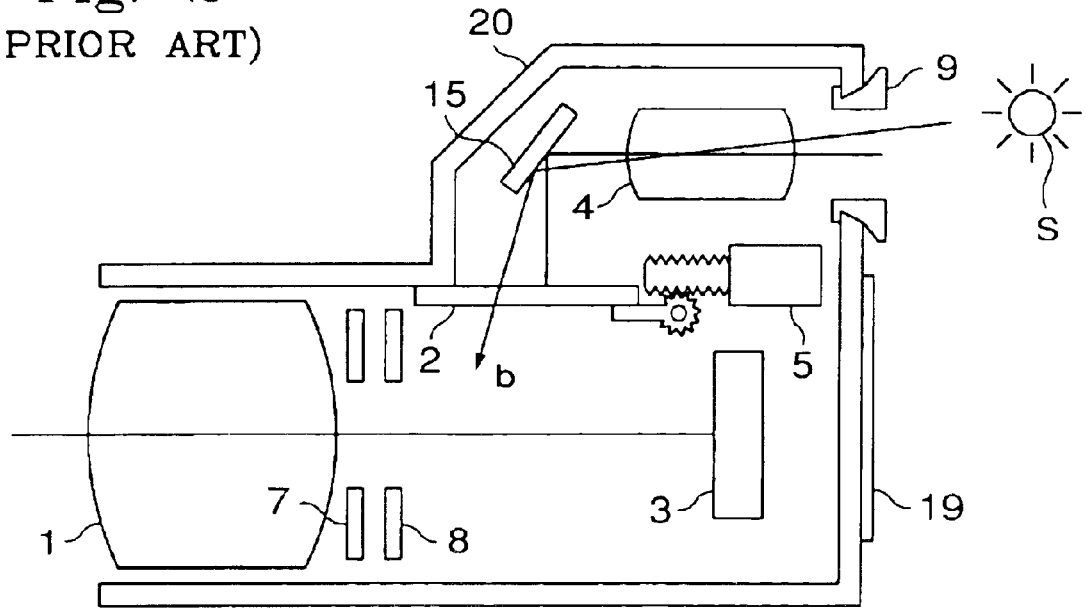
FIG. 2 is a cross section view of the essential part of the conventional digital camera of FIG. 1 illustrating the liquid crystal semi-transparent mirror in the retracted state.
Figure 3:
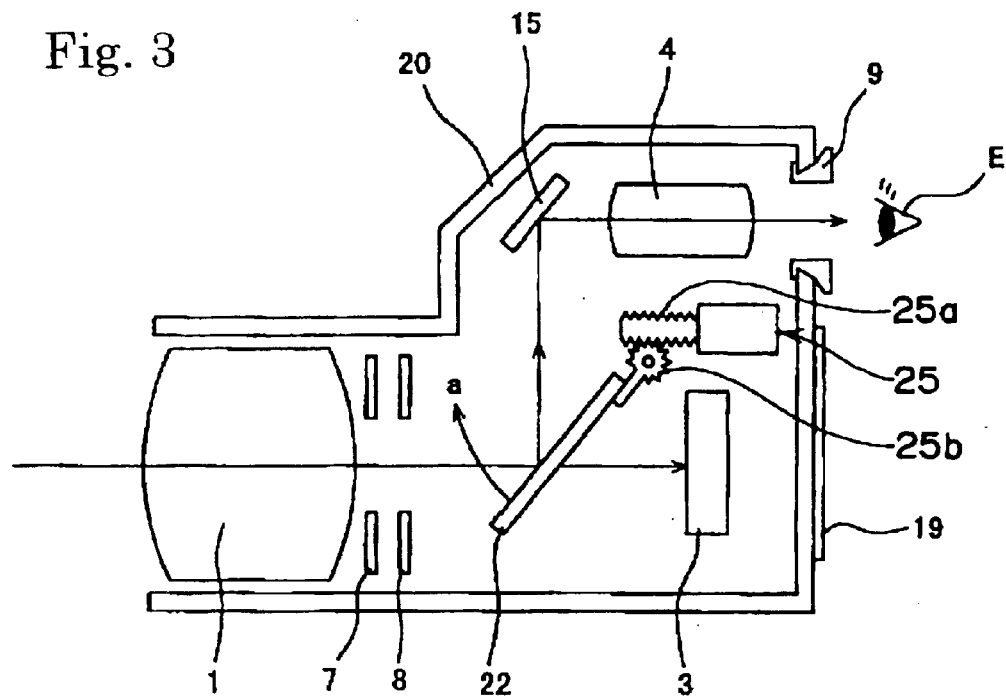
FIG. 3 is a cross section view of the essential part of an embodiment of the digital camera of the present invention.

FIG. 3 is a sectional view of the essential part of the digital camera of the present invention, and differs from the conventional construction shown in FIGS. 1 and 2 in that the normal semi-transparent mirror is replaced by a liquid crystal semi-transparent mirror 22.

Reference number 20 in FIG. 3 refers to a camera body. On the front surface of the camera body 20 is a taking lens 1, and on the back surface are a finder 9 and a back liquid crystal display 19; on the top surface is provided an image sensing button not shown in the drawings.

A photographic optical system and finder optical system are housed within the camera body 20.

The photographic optical system comprises a taking lens 1, stop (iris) 7, shutter 8, liquid crystal semi-transparent mirror 22 as a light splitting means, and a solid state image sensing element 3, which are arranged on the optical axis.

The finder optical system comprises a liquid crystal semi-transparent mirror 22 finder reflective mirror 15, finder lens 4, and finder eyepiece 9, such that the light from the taking lens 1 divided by the liquid crystal semi-transparent mirror 22 is directed to the eye E of the photographer.

The liquid crystal semi-transparent mirror 22 used as a light splitting means may have various constructions. For example, a liquid crystal plate having variable transmittance and a plurality of small pixels may be used as the liquid crystal semi-transparent mirror 22. The liquid crystal plate having variable transmittance changes from a semi-transparent state to a non-transparent state by controlling the voltage applied to each pixel. As a result, the liquid crystal semi-transparent mirror 22 changes between a semi-transparent state and a non-transparent state. That is, the pixel area of the non-transparent state and the pixel area of the transmission state are approximately uniformly dispersed, such that the applied voltage can be individually controlled so as to have transmittance of the entire liquid crystal plate set to the semi-transparent state. The entire liquid crystal plate can be set to the semi-transparent state by controlling the applied voltage such that the small pixels are set to the semi-transparent state. In this way the semi-transparent state and non-transparent state of the liquid crystal plate used as a light splitting means can be changed by controlling the voltage applied to each pixel, thereby effectively simplifying the light splitting means, rendering it more compact, and achieving low power consumption.

The liquid crystal semi-transparent mirror 22 can be constructed by providing a liquid crystal plate as described above the semi-transparent mirror or on the semi-transparent mirror (i.e., on the finder side). The liquid crystal semi-transparent mirror 22 can be constructed by forming a semi-transparent film on the glass of a liquid crystal plate. In a liquid crystal semi-transparent mirror 22 provided with a liquid crystal plate having variable transmittance, the light transmitting state of the liquid crystal plate can be changed by controlling the voltage applied to each pixel of the liquid crystal plate, and as a result the liquid crystal semi-transparent mirror 22 can be changed between a semi-transparent state and a non-transparent state. Accordingly, since the liquid crystal semi-transparent mirror 22 can be changed between a semi-transparent state and a non-transparent state by controlling the voltage applied to each pixel of the liquid crystal plate, simplification, compactness, and low power consumption of the light splitting means are effectively attained.

The liquid crystal semi-transparent mirror 22 is controlled so as to normally operate as a semi-transparent mirror before the shutter button is pressed and when image sensing ends. That is, the light entering from the taking lens 1 passes through the stop 7 and the shutter 8, and thereafter approximately one half the light is transmitted through the liquid crystal semi-transparent mirror 22 and forms an image on the solid state image sensing element 3. The remaining one half of the light is reflected by the liquid crystal semi-transparent mirror 22, reflected by the finder reflective mirror 15, and thereafter is condensed by the finder lens 4 and forms an image on the eye E of the photographer.

The liquid crystal semi-transparent mirror 22 is controlled by the mirror drive circuit 12 and driven by the liquid crystal semi-transparent mirror drive means 25 between a position inclined 45° relative to the optical axis at which it divides the light from the taking lens 1 to the finder and the solid state image sensing element 3 (light splitting position) as shown in FIG. 3, and a position at which it pops up and does not divide the light from the taking lens to the finder (retracted position).

Figure 4:
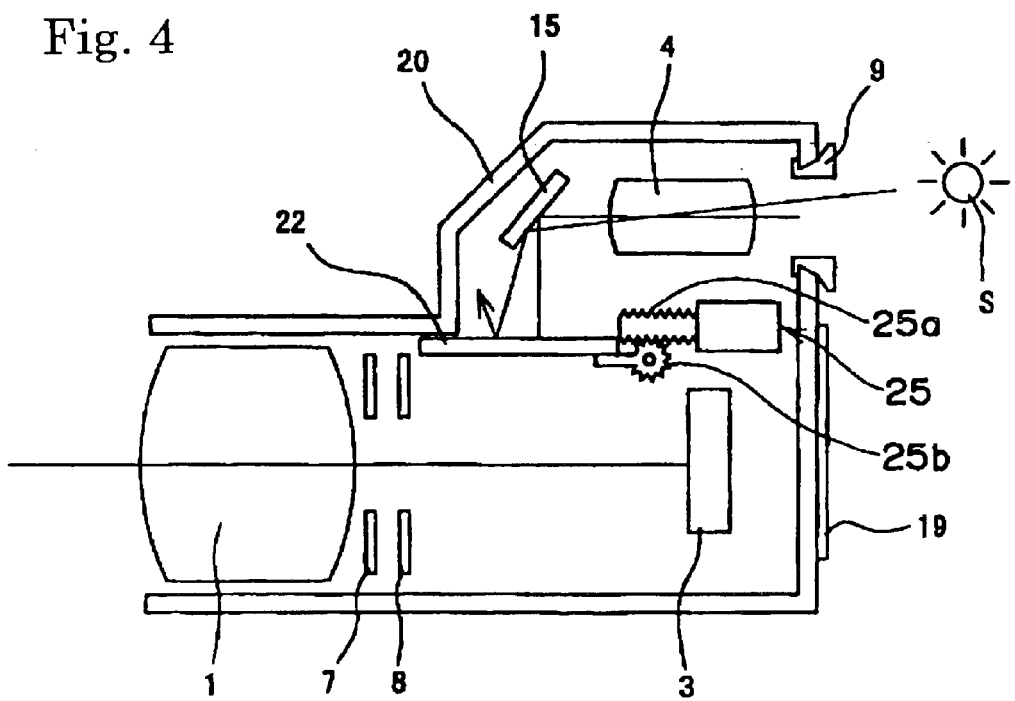
FIG. 4 is a cross section view of the essential part of the embodiment of the digital camera of FIG. 3 illustrating the liquid crystal semi-transparent mirror in the retracted state.

The liquid crystal semi-transparent mirror drive means 25 may take various forms. For example, the liquid crystal semi-transparent mirror drive means 25 shown in FIGS. 3 and 4 comprises a worm 25a and a worm wheel 25b engaged thereto mounted on the tip of a drive mechanism which rotates or advances by means of a solenoid, spring charging mechanism or the like. In the liquid crystal semi-transparent mirror drive means 25, the liquid crystal semi-transparent mirror 22 is connected to the worm wheel 25b so as to rotate integratedly with the worm wheel 25b. Accordingly, when the operation switch of the liquid crystal semi-transparent mirror drive means 25 is turned ON, the liquid crystal semi-transparent mirror 22 set at the position inclined at an angle of 45° relative to the optical axis, i.e., the light splitting position, shown in FIG. 3, is rotated on a rotational center of the rotating shaft of the work wheel 25b, so as to be lifted in the arrow a direction to a horizontal position relative to the optical axis, i.e., the retracted position, as shown in FIG. 4.

Figure 5:
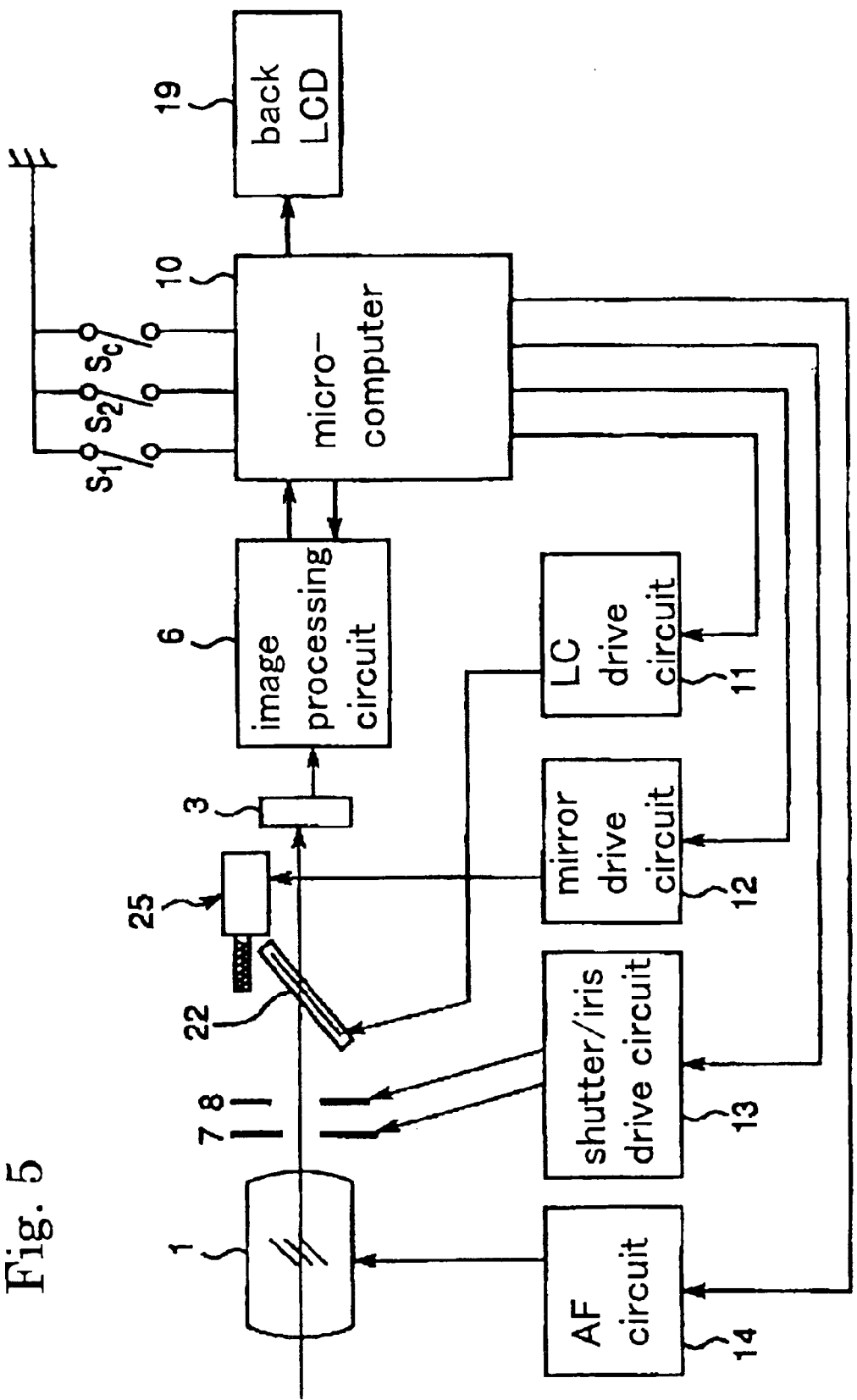
FIG. 5 is a block circuit diagram of an embodiment of the digital camera of the present invention.

The various operations of the camera are controlled by a microcomputer 10 as shown in FIG. 5. The microcomputer 10 controls an image processing circuit 6 for processing the electrical signals from the solid state image sensing element 3 (e.g., a charge coupled device), and the light transmission state of the liquid crystal (full transparent state, semi-transparent state, and non-transparent state) of the liquid crystal semi-transparent mirror 22, and is connected to a liquid crystal drive circuit 11 for displaying an image obtained by the image processing circuit 6, a mirror drive circuit 12 for driving at high speed the liquid crystal semi-transparent mirror 22 to a light splitting position and a retracted position, a shutter/iris drive circuit 13 for controlling an optimum shutter speed and stop value under the measured exposure conditions, an autofocus (AF) circuit 14 for automatically adjusting the focus of the taking lens 1, and a back liquid crystal display 19 for displaying an image obtained by the image processing circuit 6. The microcomputer 10 is also connected to a switch S1 for AF control of the taking lens 1, switch S2 for the exposure operation, and switch Sc for setting the continuous photography mode. The switch S1 may also be used as a switch for returning the photographic image displayed on the liquid crystal semi-transparent mirror 22 to non display.

The operation of this digital camera is controlled by programs stored in the microcomputer 10 and ROM (not illustrated) connected thereto.

Figure 8:
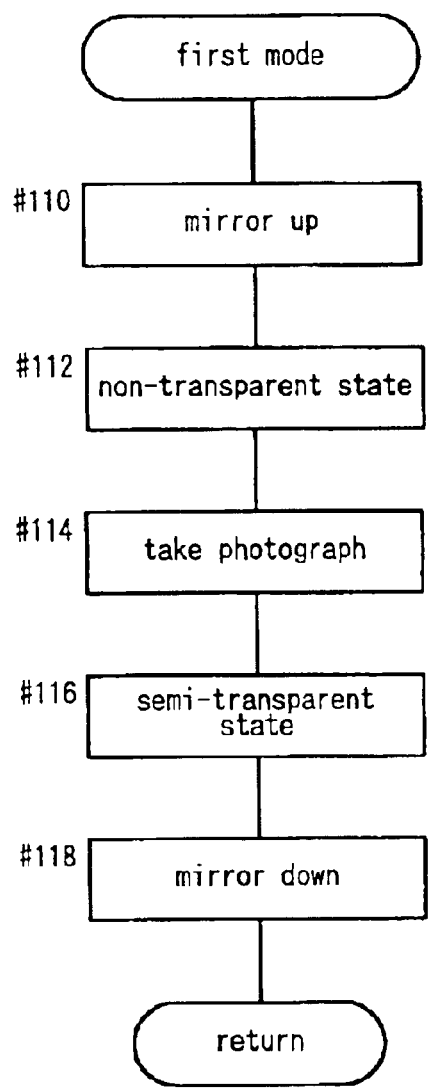
FIG. 8 is a flow chart during normal photography of the embodiment of the digital camera of the present invention.
Figure 9:
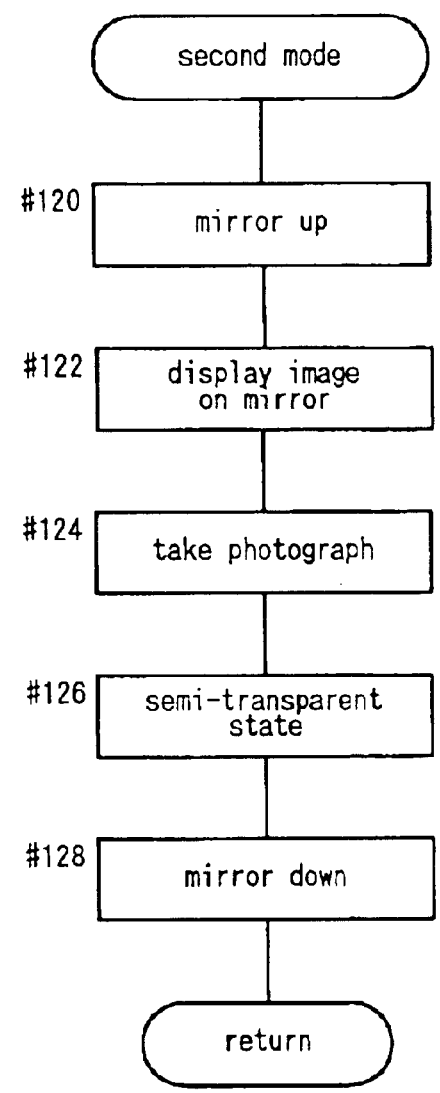
FIG. 9 is a flow chart of image display when the liquid crystal semi-transparent mirror is at the retracted position in embodiment of the digital camera of the present invention.
Figure 10:
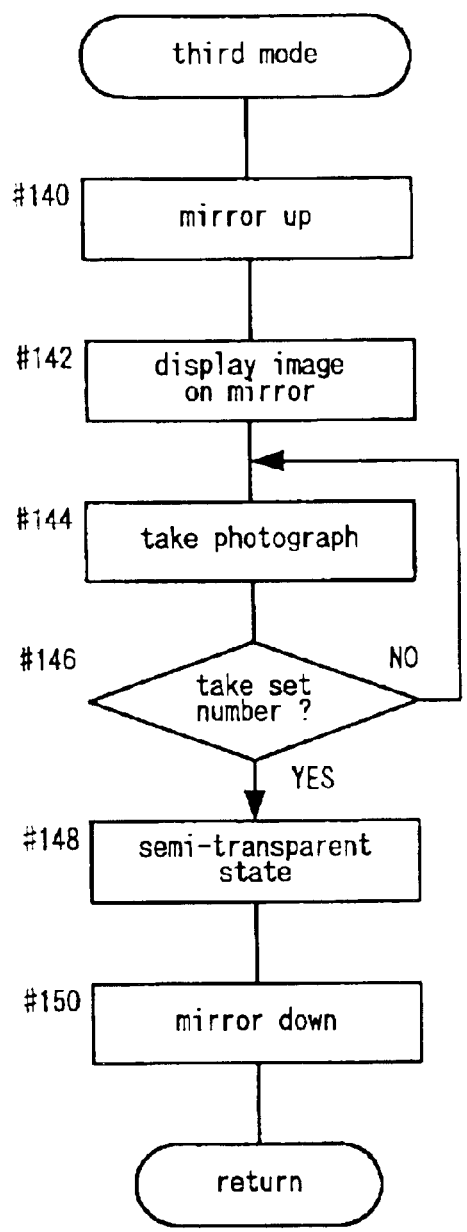
FIG. 10 is a flow chart of continuous photography in the embodiment of the digital camera of the present invention.
Figure 11:
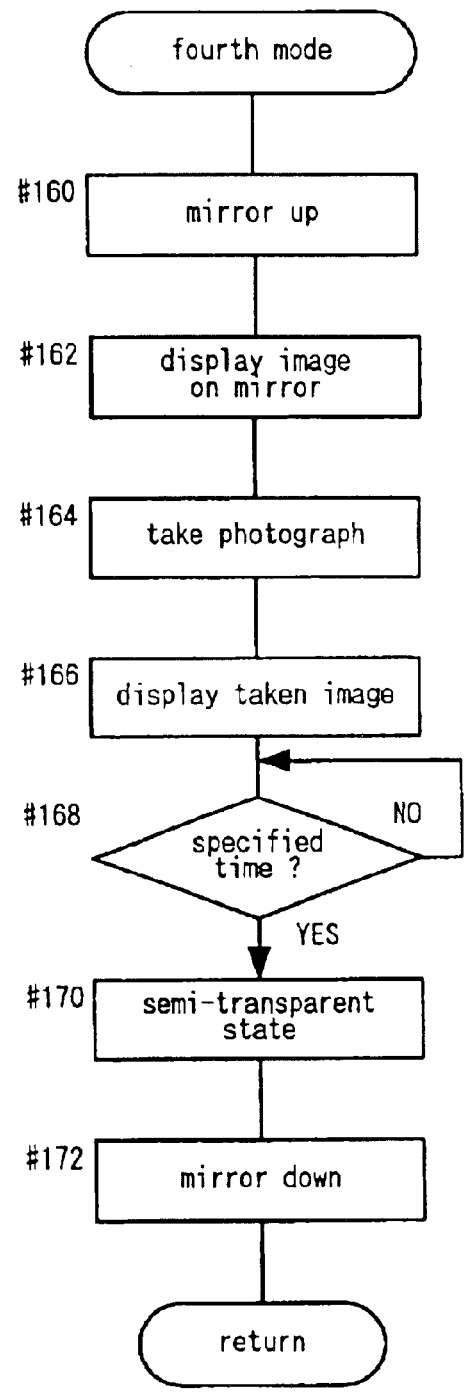
FIG. 11 is a flow chart of automatic return of the semi-transparent mirror to a non-display state after the liquid crystal semi-transparent mirror displays an image for a specific time.
Figure 12:
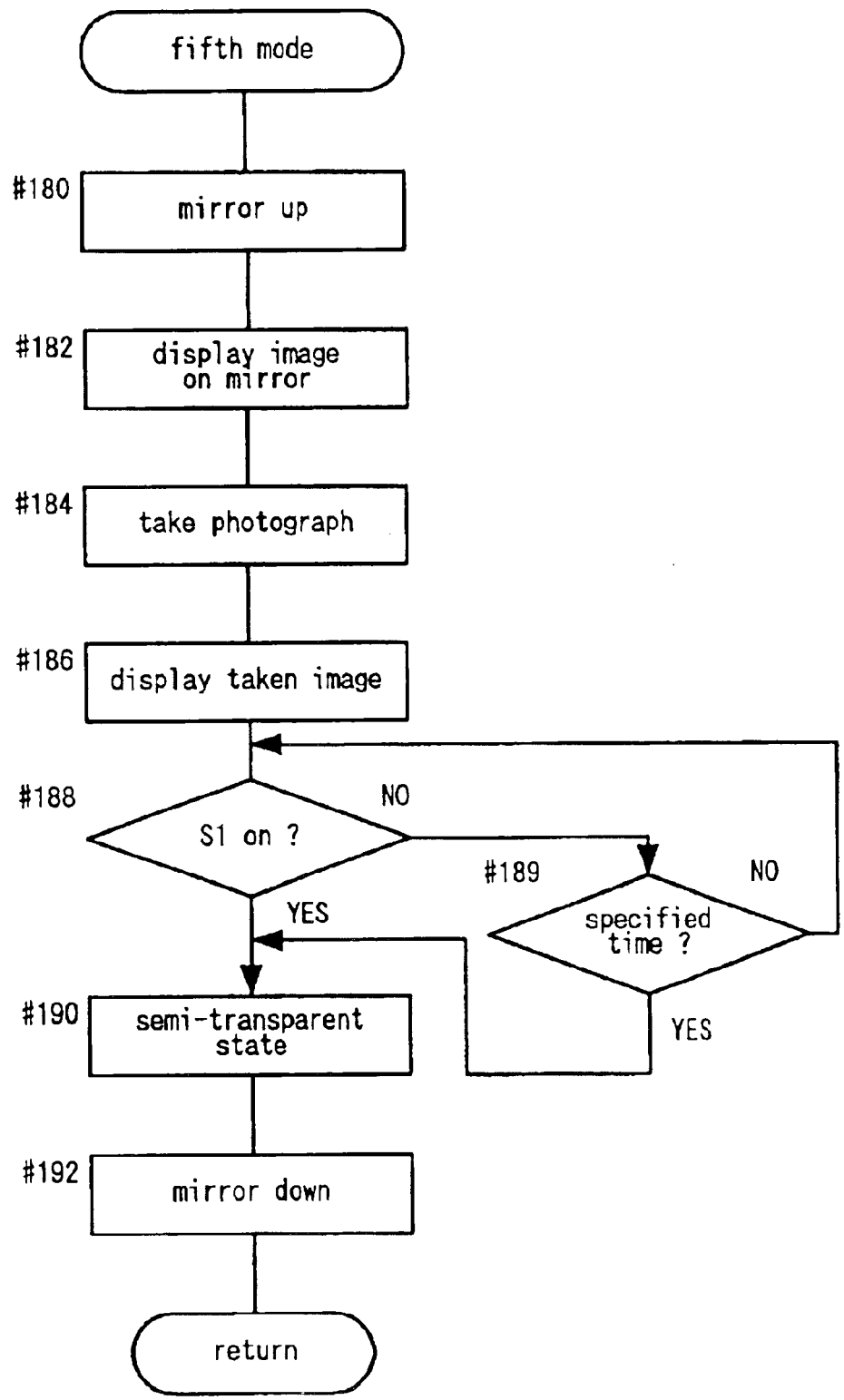
FIG. 12 is a flow chart the semi-transparent mirror to the non-display state by a return switch when the liquid crystal semi-transparent mirror displays an image in embodiment of the digital camera of the present invention.

FIGS. 8~12 are flow charts of the various photographic modes. FIG. 8 is a main flow chart showing the normal photographic mode (first photographic mode); FIG. 9 is a flow chart of the mode for displaying an image when the liquid crystal semi-transparent mirror is set at the retracted position (second photographic mode); FIG. 10 is a flow chart of the continuous photographic mode (third photographic mode); FIG. 11 is a flow chart of a mode for automatically returning the liquid crystal semi-transparent mirror displaying an image to a non-display state after a specified time has elapsed (fourth photographic mode); FIG. 12 is a flow chart of a mode for returning an image displayed on the liquid crystal semi-transparent mirror to a non-display state using the return switch (fifth photographic mode).

The first photographic mode of the digital camera of a first embodiment is described below with reference to FIGS. 3, 4, 5, and 8.

Before sensing an image, the liquid crystal semi-transparent mirror 22 is maintained inclined 45° relative to the optical axis at the light splitting position as shown in FIG. 3. The liquid crystal semi-transparent mirror 22 comprising a liquid crystal plate enters a semi-transparent state by individually controlling the voltage applied to each pixel, and approximately one half of the incidence light is transmitted and approximately one half of the remaining light is reflected as in a conventional semi-transparent mirror. That is, approximately one half of the light passing through the taking lens 1 is transmitted through the liquid crystal semi-transparent mirror 22 and is directed onto the solid state image sensing element 3. The remaining one half light is reflected upward by the liquid crystal semi-transparent mirror 22, and this reflected light is reflected by a finder mirror 15, passes through the finder lens 4, and is directed to the finder eyepiece 9.

When the shutter button is lightly pressed (half depressed) for photographic preparation, the switch S1 is closed, and after image data from the solid state image sensing element 3 are input to the microcomputer 10, an optimum exposure is determined by calculation in accordance with a specific calculation method. The optimum parameters including stop 7 aperture diameter, shutter 8 speed, white balance value and the like are determined based on this exposure value.

When part of the taking lens 1 is driven slightly in the optical axis direction, the degree of focus is evaluated based on the image data obtained by the image sensing element 3. Then, the focus is adjusted by moving a part of the taking lens 1 to a focus position based on the evaluation value. At the same time, part of the light transmitted through taking lens 1 is reflected by the liquid crystal semi-transparent mirror 22 and thereafter passes through the finder lens 4 and is directed to the finder eyepiece 9 as previously described, such that the photographer is able to confirm in real-time the image to be photographed through the finder eyepiece 9. At this time the same image as that confirmed by the finder is displayed on the back liquid crystal display 19 provided on the back side of the camera body 20.

Thereafter, when the photographer presses the shutter button (full depression), the switch S2 is closed, and the main photographic mode is entered.

When the main photographic mode is entered, the motor is actuated in the liquid crystal semi-transparent mirror drive means 25 to rotate the edge of the liquid crystal semi-transparent mirror 22 on the taking lens 1 side in the arrow a direction, i.e., upward, about the rotational axis of the worm wheel 25b mounted on the liquid crystal semi-transparent mirror 22. The liquid crystal semi-transparent mirror 22 pops up and is maintained in a horizontal state, i.e., at the retracted position, as shown in FIG. 4 (#110). At this time the liquid crystal semi-transparent mirror 22 set at the completely retracted position is confirmed by a position detection means of the liquid crystal semi-transparent mirror 22 not illustrated. Thereafter, the liquid crystal drive circuit 11 is actuated by a signal from the microcomputer 10 to drive the liquid crystal plate to enter the non-transparent state, and the liquid crystal semi-transparent mirror 22 enters the non-transparent state (#112). As a result, even though stray light indicated by the arrow b enters the interior of the camera body 20 through the finder eyepiece 9, the stray light is blocked by the liquid crystal semi-transparent mirror 22 as shown in FIG. 4. Accordingly, stray light from outside the camera is prevented from entering the interior of the camera body 20 by the liquid crystal semi-transparent mirror 22, such that stray light does not enter the image sensing element 3.

As shown in FIG. 4, when the liquid crystal semi-transparent mirror 22 pops up in the non-transparent state, the stop 7 opens and the digital camera takes a photograph at shutter speed based on the optimized exposure conditions as described above (#114). At this time all the light passing through the taking lens 1 is directed to the image sensing element 3 for use in photography, thereby enlarging the photographic range.

When the photograph is completed, the liquid crystal drive circuit 11 is actuated to set the liquid crystal semi-transparent mirror 22 to the semi-transparent/semi-reflective state by a signal from the microcomputer 10 (#116). Thereafter, a motor in the liquid crystal semi-transparent mirror drive means 25 is actuated in the reverse direction, and the liquid crystal semi-transparent mirror 22 is again maintained at the light splitting position (mirror down position) at an inclination of 45° relative to the optical axis as shown in FIG. 3 (#118).

When using a liquid crystal plate having variable transmittance as a liquid crystal semi-transparent mirror, the semi-transparent state and transparent state of the liquid crystal semi-transparent mirror 22 can be set by individually controlling the voltage applied to each pixel of the liquid crystal. Furthermore, a control method may be used to apply a specific voltage in a batch to all pixels of the liquid crystal plate. In this instance when using batch control of the voltage applied to set the transparent and non-transparent state of the liquid crystal plate, the semi-transparent mirror equipped liquid crystal semi-transparent mirror 22 may respectively be set to semi-transparency and non-transparency. Accordingly, the method of batch control of the applied voltage is a simpler control method compared to individually controlling the applied voltages, thereby simplifying the control circuit.

The second photographic mode of the digital camera of the first embodiment is described below with reference to FIGS. 3, 4, 5, and 9.

In the second photographic mode, a digital camera is used which has a construction largely similar to that used in the first photographic mode, although image data from the image sensing element 3 are displayed on the liquid crystal plate. At this time the liquid crystal plate may use a TN-type liquid crystal or TFT-type liquid crystal, and may be a black and white display or a color display.

FIG. 9 is a flow chart of the mode for displaying an image on the liquid crystal semi-transparent mirror 22 set at the retracted position. First, the liquid crystal semi-transparent mirror 22 is set at the light splitting position shown in FIG. 3, the switch S1 is closed when the shutter button is pressed halfway for preliminary photography, the light directed to the image sensing element 3 is photoelectrically converted, and preliminary photographic image data are formed by the image processing circuit 6. The photographic conductions are set based on the image data. Then, the switch S2 is closed when the shutter button is fully pressed, the camera enters the main photographic mode, and the liquid crystal semi-transparent mirror 22 is moved to the retracted position as shown in FIG. 4 (#120). Directly thereafter, the image from the taking lens 1 cannot be viewed from the finder, the liquid crystal drive circuit 11 is actuated by a signal from the microcomputer 10, and the image data are displayed on the liquid crystal plate of the liquid crystal semi-transparent mirror 22 (#122). At this time the same image as confirmed on the finder is displayed on the back liquid crystal display 19 provided on the back of the camera body 20 by the image data from the image sensing element 3.

Then, the photographic operation described in the first photographic mode is executed (#124), and when the photograph has been completed (#124), the image display is erased by a signal from the microcomputer 10, and the liquid crystal semi-transparent mirror 22 is driven by the liquid crystal drive circuit 11 to enter the semi-transparent/semi-reflective state (#126). That is, the display of the image occurs for a short time from after the mirror pops up until the liquid crystal semi-transparent mirror 22 returns to the light splitting position. Thereafter, the liquid crystal semi-transparent mirror 22 is again maintained at the light splitting position (mirror down position) inclined 45° relative to the optical axis by the liquid crystal semi-transparent mirror drive means 25 as shown in FIG. 3 (#128). The photographed image is displayed on the back liquid crystal display 19 provided on the back of the camera body 20. In this photographic mode, the photo image normally can be confirmed through the finder, and a sense of security is obtained because there is no blackout.

The third photographic mode of the digital camera of the first embodiment is described below with reference to FIGS. 3, 4, 5, and 10. In the third photographic mode, the digital camera used is identical to the camera used in the second photographic mode.

FIG. 10 is a flow chart of a mode for continuous photography and displaying an image on the liquid crystal semi-transparent mirror 22 set at the refracted position. First, the liquid crystal semi-transparent mirror 22 is set at the light splitting position shown in FIG. 3, and after the switch Sc is set to ON to set the continuous photo mode as preparation for photography, the number of continuous photographs is set. When the shutter button is pressed halfway, the switch S1 is closed, light from the taking lens 1 is photoelectrically converted by the image sensing element 3, and image data are formed by the image processing circuit 6. The photographic conditions are set based on the image data. Then, the switch S2 is closed when the shutter button is fully pressed, the camera enters the photographic mode, and the liquid crystal semi-transparent mirror 22 is moved to the retracted position as shown in FIG. 4 (#140). Directly thereafter, the image from the taking lens 1 cannot be viewed from the finder, the liquid crystal drive circuit 11 is actuated by a signal from the microcomputer 10, and the image data are displayed on the liquid crystal plate of the liquid crystal semi-transparent mirror 22 (#142). At this time the same image as confirmed on the finder is displayed on the back liquid crystal display 19 provided on the back of the camera body 20 by the image data from the image sensing element 3. Then, the photographic operation is executed (#144), and a determination is made as to whether or not the set specified number of photographs have been taken (#146). If the specified number of photographs have not been taken, continuous photography continues with the liquid crystal semi-transparent mirror 22 maintained in the retracted position until the specified number of photographs have been taken. Alternately, in step #146, the continuous photographing may execute as long as switch S2 is closed instead of based on the specified number of photographs having been taken.

When continuous photography ends, the display of the image is erased by a signal from the microcomputer 10, and the liquid crystal drive circuit is actuated to set the liquid crystal semi-transparent mirror 22 in the semi-transparent/semi-reflective state (#148). That is, the display of the image occurs for a short time in accordance with the number of continuous photographs from after the mirror pops up until the liquid crystal semi-transparent mirror 22 returns to the light splitting position. Thereafter, the liquid crystal semi-transparent mirror 22 is again maintained at the light splitting position (mirror down position) inclined 45° relative to the optical axis by the liquid crystal semi-transparent mirror drive means 25 as shown in FIG. 3 (#150). In the continuous photographic mode, continuous photography is executed with the liquid crystal semi-transparent mirror 22 maintained at the retracted position by the liquid crystal mirror drive means 25. Accordingly, high speed continuous photography is possible because the liquid crystal semi-transparent mirror 22 does not move physically during continuous photography compared to when the liquid crystal semi-transparent mirror 22 moves reciprocatingly between the light splitting position and the retracted position during continuous photography, thereby improving the reliability of the continuous photography system, and reducing the power consumption. Furthermore, the desirability of the photographic image with regard to smearing, luminance, color, focus and the like can be confirmed through the finder. As a result, since unnecessary images are not photographed, photo errors are reduced, and image storage memory is conserved. Furthermore, since the image can be confirmed by peering into the finder alone for both preliminary photography and main photography, moving the line of sight relative to the finder and the back liquid crystal display 19 before and after photography becomes unnecessary, and makes the photographic operation extremely comfortable. In addition, when the display to the liquid crystal is continuously switched in conjunction with continuous photography, the object image can be continuously confirmed in the finder since the object image to be photographed is displayed.

The fourth photographic mode of the digital camera of the first embodiment is described below with reference to FIGS. 3, 4, 5, and 11. In the fourth photographic mode, the digital camera used has the same construction as the camera used in the second photographic mode.

FIG. 11 is a flow chart of the mode for displaying a main photographic image for a specified time on the liquid crystal semi-transparent mirror 22 set at the retracted position. First, the liquid crystal semi-transparent mirror 22 is set at the light splitting position, and the photographer sets the image display time beforehand. The switch S1 is closed when the shutter button is pressed halfway for preliminary photography, the light directed to the image sensing element 3 is photoelectrically converted, and image data are formed by the image processing circuit 6. The photographic conditions are set based on the image data. Then, the switch S2 is closed when the shutter button is fully pressed, the camera enters the main photographic mode, and the liquid crystal semi-transparent mirror 22 is moved to the retracted position as shown in FIG. 4 (#160). Directly thereafter, the image from the taking lens 1 cannot be viewed from the finder, the liquid crystal drive circuit 11 is actuated by a signal from the microcomputer 10, and the image data are displayed on the liquid crystal plate of the liquid crystal semi-transparent mirror 22 (#162). At this time the same image as confirmed on the finder is displayed on the back liquid crystal display 19 provided on the back of the camera body 20 by the image data from the image sensing element 3. When main photography (#164) ends, the photographed image is displayed on the liquid crystal semi-transparent mirror 22 (#166). Then a determination is made as to whether or not the photographed image has been displayed the specified time (#168). If the specified time has not elapsed, the display on the liquid crystal semi-transparent mirror 22 continues. At this time the same image as confirmed on the finder is displayed on the back liquid crystal display 19 provided on the back of the camera body 20 by the image data from the image sensing element 3.

When the main photography image has been displayed the specified time, the display of the image is erased by a signal from the microcomputer 10, and the liquid crystal drive circuit 11 is actuated to set the liquid crystal semi-transparent mirror 22 in the semi-transparent/semi-reflective state (#170). That is, the display of the image occurs for a set specified time after the mirror pops up until the liquid crystal semi-transparent mirror 22 returns to the light splitting position. Thereafter, the liquid crystal semi-transparent mirror 22 is again maintained at the light splitting position (mirror down position) inclined 45° relative to the optical axis by the liquid crystal semi-transparent mirror drive means 25 as shown in FIG. 3 (#172). In the main photographic image display mode, since the main photographic image is displayed on the liquid crystal semi-transparent mirror 22 for an optional set time, the desirability of the photographic image with regard to smearing, luminance, color, focus and the like can be confirmed through the finder any time during the set time. As a result, since unnecessary images are not photographed, photo errors are reduced, and image storage memory is conserved. Furthermore, since the image can be confirmed by peering into the finder alone for both preliminary photography and main photography, moving the line of sight relative to the finder and the back liquid crystal display 19 before and after photography becomes unnecessary, and makes the photographic operation extremely comfortable.

The fifth photographic mode of the digital camera of the first embodiment is described below with reference to FIGS. 3, 4, 5, and 12. The digital camera used in the fifth photographic mode is identical to the camera of the second photographic mode.

FIG. 12 is a flow chart of the mode for displaying a main photographic image on the liquid crystal semi-transparent mirror 22 set at the retracted position, and during this display time returning to the non-display state by pressing the return switch S1. First, the liquid crystal semi-transparent mirror 22 is set at the light splitting position shown in FIG. 3. The switch Si is closed when the shutter button is pressed halfway, the light directed to the image sensing element 3 is photoelectrically converted, and image data are formed by the image processing circuit 6. The photographic conditions are set based on the image data. Then, the switch S2 is closed when the shutter button is fully pressed, the camera enters the main photographic mode, and the liquid crystal semi-transparent mirror 22 is moved to the retracted position as shown in FIG. 4 (#180). Directly thereafter, the image from the taking lens 1 cannot be viewed from the finder, the liquid crystal drive circuit 11 is actuated by a signal from the microcomputer 10, and the image data are displayed on the liquid crystal plate of the liquid crystal semi-transparent mirror 22 (#182). At this time the same image as confirmed on the finder is displayed on the back liquid crystal display 19 provided on the back of the camera body 20 by the image data from the image sensing element 3. When main photography (#184) ends, the photographed image is displayed on the liquid crystal semi-transparent mirror 22 (#186). Then a determination is made as to whether or not the return switch S1 has been pressed (#188). If the return switch S1 has not been pressed, a check is made to determine whether or not the main photographic image has been displayed the specified time (#189). Since the display continues if the return switch SI is not pressed, the liquid crystal semi-transparent mirror 22 is forcibly returned when the specified time (the specified time may be set in the camera beforehand, or may be set by the photographer) has elapsed. If the specified time has not elapsed, the main photography image is displayed on the liquid crystal semi-transparent mirror 22. If the specified time has elapsed, the photographic image displayed on the liquid crystal semi-transparent mirror 22 is discontinued, and the process advances to the next step. However, if the photographer presses the return switch S1 during image display, the process advances to the next step. At this time the same image as confirmed on the finder is displayed on the back liquid crystal display 19 provided on the back of the camera body 20 by the image data from the image sensing element 3.

Next, the liquid crystal drive circuit 11 is actuated to set the liquid crystal semi-transparent mirror 22 to the semi-transparent/semi-reflective state by a signal from the microcomputer 10 (#190). That is, the image is displayed from after the mirror pops up until the liquid crystal semi-transparent mirror 22 returns to the light splitting position, until the switch S1 is pressed, or for the specified time if the switch S1 is not pressed. Thereafter, the liquid crystal semi-transparent mirror drive means 25 is actuated, and the liquid crystal semi-transparent mirror 22 is again maintained at the light splitting position (mirror down position) at an inclination of 45° relative to the optical axis as shown in FIG. 3 (#192). In this photographic mode, the liquid crystal semi-transparent mirror 22 displaying the main photographic image is returned from the display state to the non-display state by a timing optionally selected by the photographer, then moved to the next photograph. Accordingly, the desirability of the photographic image with regard to smearing, luminance, color, focus and the like can be confirmed through the finder. As a result, since unnecessary images are not photographed, photo errors are reduced, and image storage memory is conserved. Furthermore, since the image can be confirmed by peering into the finder alone for both preliminary photography and main photography, moving the line of sight relative to the finder and the back liquid crystal display 19 before and after photography becomes unnecessary, and makes the photographic operation extremely comfortable. Although the switch S1 is used as the return means of the liquid crystal semi-transparent mirror 22, the present invention is not limited to this arrangement inasmuch as a separate member, for example, also may be provided.

Another embodiment of the digital camera is described below with reference to FIGS. 6 and 7.

Figure 6:
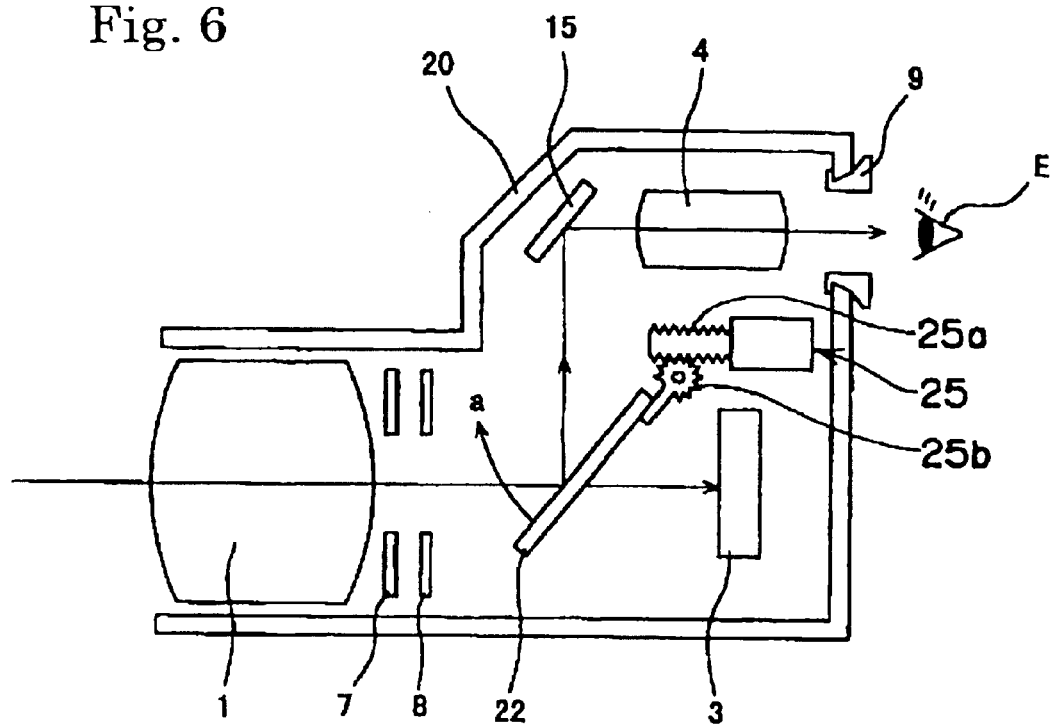
FIG. 6 is a cross section view of the essential part of another embodiment of the digital camera of the present invention.
Figure 7:
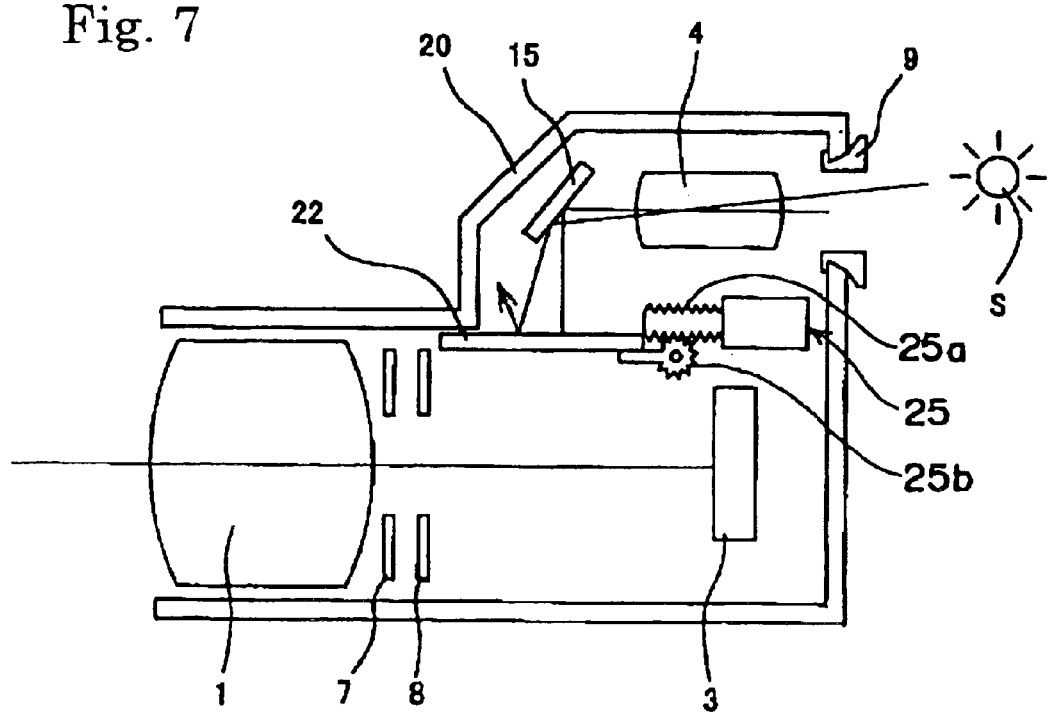
FIG. 7 is a cross section view of the essential part of the embodiment of the digital camera of FIG. 6 illustrating the liquid crystal semi-transparent mirror in the retracted state.

FIG. 6 is a cross section view of the essential part of a digital camera of another embodiment of the present invention, and shows the liquid crystal semi-transparent mirror 22 set at the light splitting position. FIG. 7 is a cross section view showing the liquid crystal semi-transparent mirror of FIG. 6 set at the retracted position. The embodiment of the digital camera shown in FIGS. 6 and 7 is basically similar in construction to the camera of the first embodiment, but differs from the first embodiment in that the back liquid crystal display 19 is not provided on the back side of the camera body 20.

The digital camera of this embodiment is capable of photography in accordance with the first through fifth photographic modes identical to those described for the digital camera of the first embodiment. Since the digital camera of this embodiment is not provided with a back liquid crystal display 19, the image captured by the image sensing element 3 is displayed entirely on the liquid crystal semi-transparent mirror 22 set at the retracted position. Accordingly, in the second through fifth photographic modes described for the digital camera of the first embodiment, the preliminary photographic image and the main photographic image are both displayed on the liquid crystal plate of the liquid crystal semi-transparent mirror 22 set at the retracted position, and the photographer observes only this display image. Since the back liquid crystal display 19 is not provided, the digital camera is more compact and lighter weight, and has reduced power consumption. Furthermore, since the photographer looks only through the finder during photography, the photographer can concentrate on the photography such that photographic errors are reduced.

What is claimed is:

1. A camera comprising:
   a taking lens;
   an image sensor;
   a finder;
   a light splitter which is movable between a first position to divide light transmitted through the taking lens to the image sensor and the finder and a second position in which the light splitter is away from the light transmitted through the taking lens and the light is directed only to the image sensor;
   a driver which moves the light splitter to the first position and the second position; and
   a controller which controls the light splitter to a semi-transparent state in the first position and a blocking state in the second position.

2. A camera according to claim 1, wherein said light splitter is a liquid crystal plate of variable transmittance.

3. A camera according to claim 1, wherein said light splitter provides a liquid crystal plate having variable transmittance on a semi-transparent mirror.

4. A camera according to claim 1, wherein said light splitter provides a display which is able to display an image sensed by the image sensor.

5. A camera according to claim 4, wherein said driver maintains the light splitter at the second position for a specific time after the image sensor senses the image and the display displays the image sensed by the image sensor.

6. A camera according to claim 1, wherein said driver maintains the light splitter at the second position when the sensor is continuously sensing a plurality of images.

7. A camera according to claim 6, wherein said light splitter provides a display which is able to display an image sensed by the image sensor.

8. A camera according to claim 1, further comprising a return switch which instructs the driver to move the light splitter from the second position to the first position when the light splitter is at the second position.

9. A method to control a splitter which is provided in a camera and is movable between a first position to divide light transmitted through a taking lens to an image sensor and a finder and a second position in which the splitter is away from the light transmitted through the taking lens and the light is directed only to the image sensor, the method comprising the steps of:

controlling the splitter to a semi-transparent state in the first position; and controlling the splitter to a blocking state in the second position.

10. A method according to claim 9, further comprising the step of:

displaying an image sensed by the image sensor on the splitter when the splitter is in the second position.

* * * * *